United States Patent
Kim et al.

(10) Patent No.: US 10,331,270 B2
(45) Date of Patent: Jun. 25, 2019

(54) DISPLAY APPARATUS AND CONTROL METHOD THEREOF

(71) Applicant: SAMSUNG ELECTRONICS CO., LTD., Suwon-si, Gyeonggi-do (KR)

(72) Inventors: Gwan-Hyung Kim, Suwon-si (KR); Sang-ho Kim, Hwaseong-si (KR); Hui-jun Shim, Suwon-si (KR); Ji-hye Ha, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/706,940

(22) Filed: Sep. 18, 2017

(65) Prior Publication Data

US 2018/0081492 A1  Mar. 22, 2018

(30) Foreign Application Priority Data

Sep. 20, 2016 (KR) .................. 10-2016-0120258

(51) Int. Cl.
| | |
|---|---|
| *G06F 3/041* | (2006.01) |
| *G06F 3/0354* | (2013.01) |
| *G06F 3/044* | (2006.01) |
| *G06F 3/045* | (2006.01) |
| *G06F 3/0488* | (2013.01) |

(52) U.S. Cl.
CPC ........ *G06F 3/0418* (2013.01); *G06F 3/03545* (2013.01); *G06F 3/044* (2013.01); *G06F 3/045* (2013.01); *G06F 3/0416* (2013.01); *G06F 3/0488* (2013.01); *G06F 2203/04104* (2013.01); *G06F 2203/04108* (2013.01)

(58) Field of Classification Search
CPC .... G06F 3/0416; G06F 3/044; G06F 3/04883; G06F 3/041; G06F 3/0488; G06F 2203/04104; G06F 2203/04808; G06F 3/03545; G06F 3/0412
See application file for complete search history.

(56) References Cited

U.S. PATENT DOCUMENTS

| | | | |
|---|---|---|---|
| 4,686,332 A | 8/1987 | Greanias et al. | |
| 5,365,461 A | 11/1994 | Stein et al. | |
| 2007/0287494 A1* | 12/2007 | You ........................ | H04M 1/23 455/550.1 |
| 2009/0174650 A1* | 7/2009 | Choi ..................... | G06F 3/0418 345/104 |
| 2009/0256814 A1* | 10/2009 | Chung .................. | G06F 1/3215 345/173 |
| 2012/0268378 A1* | 10/2012 | Tokutake .............. | G06F 3/0416 345/168 |
| 2013/0271434 A1 | 10/2013 | King-Smith et al. | |

(Continued)

*Primary Examiner* — Sanjiv D. Patel
(74) *Attorney, Agent, or Firm* — Nixon & Vanderhye P.C.

(57) ABSTRACT

A display apparatus is provided. The display apparatus includes a display and a controller. The display is configured to display an image and comprises a touch sensor for touch input within an assigned sensing section. The controller is configured to perform an operation corresponding to the touch input sensed within the sensing section, and to control the touch sensor to adjust the sensing section based on conditions for adjusting the sensing section. With this, the display apparatus and a control method thereof which can efficiently sense, without lowering the speed of sensing, a touch input based on a plurality of pens or fingers is provided.

20 Claims, 14 Drawing Sheets

(56) References Cited

U.S. PATENT DOCUMENTS

| | | | | |
|---|---|---|---|---|
| 2014/0191996 A1* | 7/2014 | Hwang | ................... | G06F 3/041 |
| | | | | 345/173 |
| 2015/0168466 A1* | 6/2015 | Park | ...................... | G01B 7/004 |
| | | | | 324/76.39 |
| 2015/0253923 A1* | 9/2015 | Cho | ...................... | G06F 3/0488 |
| | | | | 345/173 |
| 2015/0261356 A1* | 9/2015 | Shepelev | ................ | G06F 3/044 |
| | | | | 345/174 |
| 2015/0301719 A1* | 10/2015 | Shinde | ................ | G06F 3/04842 |
| | | | | 715/808 |
| 2016/0328051 A1* | 11/2016 | Shishido | ................ | G06F 3/044 |

\* cited by examiner

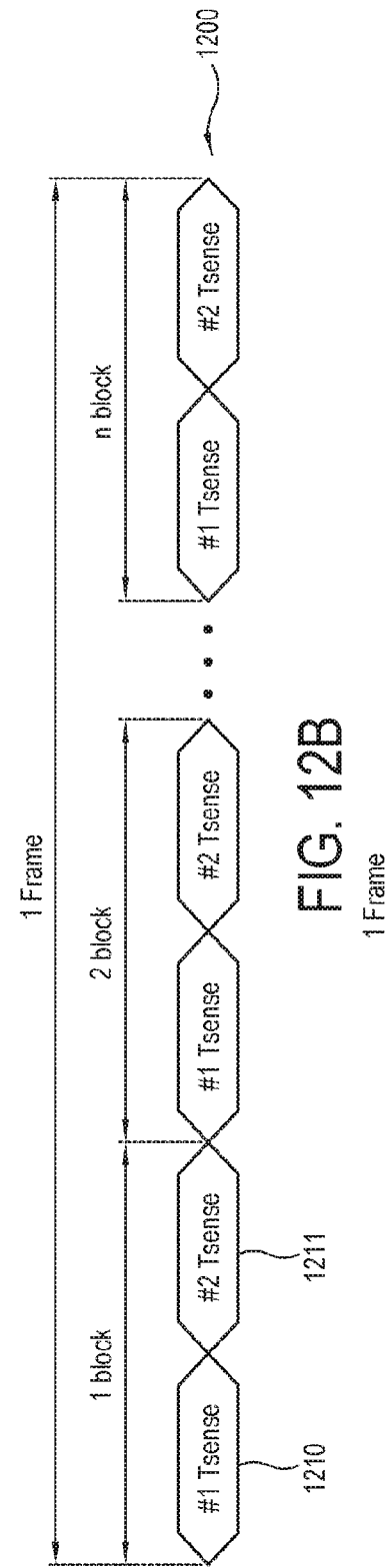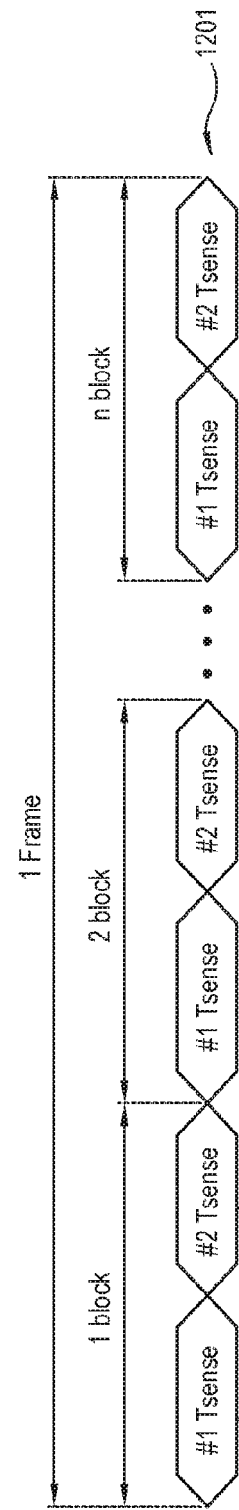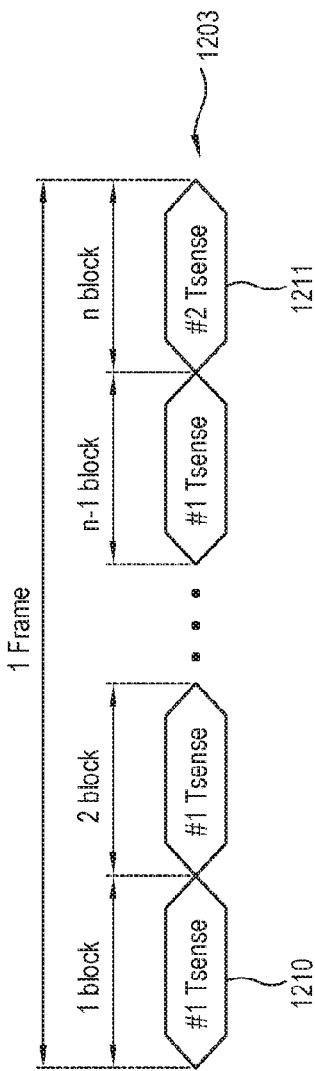

DISPLAY APPARATUS AND CONTROL METHOD THEREOF

CROSS-REFERENCE TO RELATED APPLICATION

The application is based on and claims priority under 35 U.S.C. § 119 to Korean Patent Application No. 10-2016-0120258 filed on Sep. 20, 2016 in the Korean Intellectual Property Office, the disclosure of which is incorporated by reference herein in its entirety.

BACKGROUND

Field

The present disclosure relates generally to a display apparatus and a control method thereof, and for example to a display apparatus for efficiently sensing a touch input based on a plurality of pens or fingers and a control method thereof.

Description of Related Art

Various input devices have been recently used in a display apparatus. As one of the input devices, there is a touch screen in which a touch sensor arranged on a display panel of the display apparatus and senses a user's touch input. The touch screen may sense the touch input by distinguishing various means such as a user's hand or a pen. Further, if there are a plurality of touch inputs, the touch screen must sense the plurality of touch inputs by distinguishing them from one another. Furthermore, the touch screen must also distinguish the strength (or pen pressure), speed, angle, etc. of the touch input as well as the position of the touch input.

To sense a plurality of touch inputs having such various characteristics, the display apparatus may for example use a time-division method, a frequency-division method, etc. In case of the time-division method, each pen may for example code pen identification (ID), sensed pressure, etc., embed the coded information in carriers by the time-division method and transmit the carriers to the touch sensor of the display panel. Then, the display apparatus distinguishes the characteristics of the touch input of each pen based on the information embedded in the carrier received by the time-division method. In case of a large format display apparatus where electrodes of the touch sensor have high resistance or high parasitic capacitance, the carrier needs to have a long period for accuracy of information embedded in the carrier, and this causes a touch sensing speed to be lowered.

If a separate wireless communication module is used instead of the carrier for transmitting the information, the carrier does not have to have the long period, but the separate communication module increases the size, weight, costs, etc. of the pen and shortens use time of the pen due to electric power consumed in the communication module.

As a touch panel increases in size, the number or the kinds of touch inputs may increase and thus higher precision is required in sensing a touch input. To accurately sense the touch input of high precision, a sensing section set for sensing the touch input increases and this causes the touch sensing speed to be lowered, thereby deteriorating usability of the display apparatus.

SUMMARY

An aspect of one or more example embodiments is to provide a display apparatus for efficiently sensing a plurality of touch inputs based on various means such as a pen, a finger, or the like, without lowering a touch sensing speed, and a control method thereof.

According to an aspect of an example embodiment, a display apparatus is provided, including: a display configured to display an image and comprising a touch sensor configured to sense a touch input in an assigned sensing section; and a controller configured to perform an operation corresponding to the touch input sensed within the sensing section, and to control the touch sensor to adjust the sensing section based on conditions for adjusting the sensing section. Thus, it is possible to efficiently sense the plurality of touch inputs based on various means such as a pen, a finger, etc. without lowering a touch sensing speed.

The sensing section may include a first sensing section configured to sense a plurality of frequencies of touch inputs distributed at first intervals, and a second sensing section configured to sense a shift of the frequency distributed at second intervals smaller than the first interval, and the controller may be configured to adjust at least one of the first sensing section and the second sensing section. Thus, the plurality of sensing sections may be adjusted for efficiently sensing various touch inputs and touch characteristics.

The controller may increase the second sensing section if a plurality of touch inputs corresponding to the plurality of frequencies is sensed in the first sensing section. Thus, it is possible to accurately sense a frequency shift even though there is frequency interference between the plurality of touch inputs.

The controller may identify the plurality of touch inputs based on the frequencies. Thus, it is possible to simply distinguish between the plurality of touch inputs, thereby improving a speed of detecting the touch input.

The controller may identify at least one of strength, an input time and an additional command of the touch input in accordance with the shift of the frequency. Thus, the touch characteristics can be simply identified, thereby improving usability.

The touch sensor may adjust the sensing section by increasing/decreasing at least one of length of the sensing section and the number of sensing sections within unit time. Thus, the plurality of sensing sections assigned for sensing the plurality of touch inputs and/or touch characteristics is dynamically adjusted to thereby efficiently sense the touch input.

The controller may adjust the sensing section based on how close an input making the touch input is to a touch screen. Thus, the sensing section for sensing the touch characteristics is adjusted to thereby efficiently sense the touch input.

The controller may adjust the sensing section based on at least one of the number, frequencies and kinds of touch inputs. Thus, various conditions for adjusting the sensing section are introduced.

The controller may adjust the sensing section based on the precision required in sensing the touch input. Thus, additional conditions for adjusting the sensing section are introduced.

The controller may adjust the sensing section based on whether an application or function related to the touch input is activated or inactivated. Thus, the sensing section is adjusted as necessary to thereby efficiently sense the touch input.

The controller may adjust the sensing section based on an adjustment command. Thus, a user's intention is reflected in adjusting the sensing section, thereby improving convenience.

According to an aspect of an example embodiment, a method of controlling a display apparatus is provided, the method including: displaying an image and sensing a touch input within an assigned sensing section; and performing an operation corresponding to the touch input sensed within the sensing section, and adjusting the sensing section based on conditions for adjusting the sensing section. Thus, it is possible to efficiently sense the plurality of touch inputs based on various means such as a pen, a finger, etc. without lowering a touch sensing speed.

The sensing section may include a first sensing section configured to sense a plurality of frequencies of touch inputs distributed at first intervals, and a second sensing section configured to sense a shift of the frequency distributed at second intervals smaller than the first interval, and the method may further include adjusting at least one of the first sensing section and the second sensing section. Thus, the plurality of sensing sections is adjusted for efficiently sensing various touch inputs and touch characteristics.

The adjusting at least one of the first sensing section and the second sensing section may include increasing the second sensing section if a plurality of touch inputs corresponding to the plurality of frequencies is sensed in the first sensing section. Thus, it is possible to accurately sense a frequency shift even though there may be frequency interference between the plurality of touch inputs.

The method may further include identifying the plurality of touch inputs based on the frequencies. Thus, it is possible to simply distinguish between the plurality of touch inputs, thereby improving a speed of detecting the touch input.

The method may further include identifying at least one of strength, an input time and an additional command of the touch input based on the shift of the frequency. Thus, the touch characteristics can be simply identified, thereby improving usability.

The adjusting the sensing section may include adjusting the sensing section by increasing/decreasing at least one of length of the sensing section and the number of sensing sections within unit time. Thus, the plurality of sensing sections assigned for sensing the plurality of touch inputs and/or touch characteristics is dynamically adjusted to thereby efficiently sense the touch input.

The adjusting the sensing section may include adjusting the sensing section based on how close an input making the touch input is to a touch screen. Thus, the sensing section for sensing the touch characteristics is adjusted as necessary to thereby efficiently sense the touch input.

The adjusting the sensing section may include adjusting the sensing section based on at least one of the number, frequencies and kinds of touch inputs. Thus, various conditions for adjusting the sensing section are introduced.

The adjusting the sensing section may include adjusting the sensing section based on the precision required in sensing the touch input. Thus, additional conditions for adjusting the sensing section are introduced.

The adjusting the sensing section may include adjusting the sensing section based on whether an application or function related to the touch input is activated or inactivated. Thus, the sensing section is adjusted as necessary to thereby efficiently sense the touch input.

The adjusting the sensing section may include adjusting the sensing section based on an adjustment command. Thus, a user's intention is reflected in adjusting the sensing section, thereby improving convenience.

BRIEF DESCRIPTION OF THE DRAWINGS

The above and/or the aspects, features and attendant advantages of the present disclosure will become apparent and more readily appreciated from the following detailed description, taken in conjunction with the accompanying drawings, in which like reference numerals refer to like elements, and wherein:

FIGS. 12A, 12B and 12C are diagrams illustrating an example of modifying the length and number of sensing sections within unit time according to an example embodiment;

DETAILED DESCRIPTION

Below, various example embodiments will be described in greater detail with reference to accompanying drawings. The following descriptions of the example embodiments are made by referring to elements shown in the accompanying drawings, in which like numerals refer to like elements having substantively the same functions.

In the description of the example embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the idea of the disclosure.

The present disclosure to be described below may be applied to a display apparatus capable of receiving a user's touch input. As an example of the display apparatus according to an example embodiment, an electronic blackboard having a large display panel will be described, but the disclosure is not limited thereto. The display apparatus according to an example embodiment may be realized by a smart phone, a personal digital assistant (PDA), a personal computer (PC), a laptop computer, a television (TV), an electronic frame, a smart watch, a billboard, or the like, but is not limited thereto.

Figure 1A:
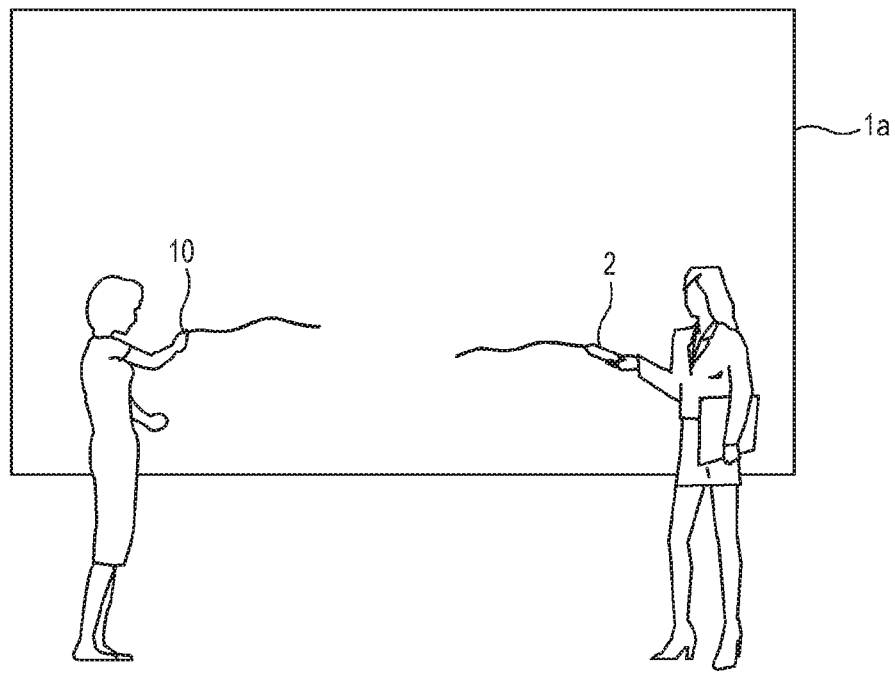
FIGS. 1A and 1B are diagrams illustrating an example of a display apparatus which senses a touch input of a user according to an example embodiment.
Figure 1B:
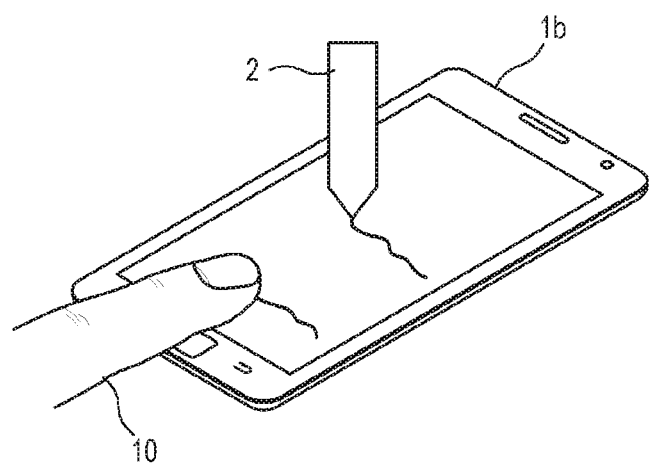

FIGS. 1A and 1B are diagrams illustrating an example of a display apparatus which senses a touch input according to an example embodiment. The display apparatus 1a or 1b displays an image and performs various functions in response to a command input by a user. A user's command may be received in the form of a touch input. The display apparatus 1a or 1b may receive a touch input based on a user's hand (or finger) 10 and at least one pen 2 through a display panel where an image is displayed. Referring to FIG. 1A, the display apparatus 1a according to an example embodiment is a large electronic blackboard that receives touch inputs of users. Referring to FIG. 1B, the display apparatus 1b according to another example embodiment is an electronic device such as, for example, and without limitation, a smartphone, a PDA, or the like, that receives various touch inputs.

The display apparatus 1a or 1b performs a predetermined function corresponding to a touched position in response to a touch input based on a user's finger 10 or a pen 2. For example, the display apparatus 1a or 1b may display a pointer at a position touched with the user's finger 10 or the pen 2, draw a line, a figure, etc. along the touch using the finger 10 or the pen 2, or select a graphic user interface (GUI) menu corresponding to a position touched with the finger 10 or the pen 2. Further, the display apparatus 1a or 1b may perform various functions in accordance with characteristics of a touch input based on the finger 10 or the pen 2. According to an example embodiment, the characteristics of the touch input include the strength (or pen pressure), speed, angle, etc. of the touch input. Various functions of the display apparatus 1a or 1b according to an example embodiment, which can be implemented in accordance with the characteristics of the touch input, will be described later. The finger 10 and the pen 2 are simply examples of a touch input means according to an example embodiment, and there are no limits to the touch input means according to an example embodiment.

Regarding a touch input using a user's finger 10, the display apparatus 1a or 1b senses the touch input based on the user's finger 10 by, for example, and without limitation, a resistive or capacitive method. In case of the resistive method, the touch input is sensed based on change in an electric current and resistance due to pressure of the finger 10. In case of the capacitive method, the electric current flows as a driving signal in a display panel and thus the touch input is sensed based on change in the driving signal when a user's finger 10 touches the display panel.

Regarding a touch input using the pen 2, the display apparatus 1a or 1b senses the touch input based on the pen 2 in accordance with, for example, and without limitation, frequency characteristics of a pen signal received from the pen 2. The pen signal has its own frequency range assigned to each pen 2 within the plurality of different frequency ranges. Further, the frequency of the pen signal is shifted according to the touch characteristics of the pen 2 such as the strength (or pen pressure), speed, angle, etc. of the touch input. The display apparatus 1 identifies the pen 2 and the characteristics of its touch input based on the frequency characteristics of the pen signal. The display apparatus 1 performs a function corresponding to the identified pen 2 and the characteristics of its touch input. More detailed descriptions will be given later.

The display apparatus 1a or 1b according to an example embodiment may sense a touch input within an assigned sensing section. There may be a plurality of sensing sections according to the number and kinds of touch inputs expected to be received.

In this example embodiment, the display apparatus 1a or 1b may adjust the sensing section if a condition for adjusting the sensing section is satisfied. For example, there may be the following conditions where the display apparatus 1a or 1b according to an example embodiment adjusts the sensing section. First, the display apparatus 1a or 1b may adjust the sensing section in accordance with how close an input means such as a user's finger 10, the pen 2 and the like for making a touch input is to the touch screen. For example, if the pen 2 moves close to the display panel, the strength of the pen signal sensed in the display panel is changed. The display apparatus 1a or 1b may determine whether the pen 2 is close and how close the pen 2 is based on change in the strength of the pen signal. More detailed descriptions will be given later with reference to FIGS. 6 and 7. If the input means moves closer to the display apparatus 1a or 1b, the sensing section may increase since the display apparatus 1a or 1b may need to more precisely sense the position or the additional change of the touch input. On the other hand, if the input means moves away from or is not present in the vicinity of the display apparatus 1a or 1b, the sensing section may be decreased enough to sense only the presence of the touch input.

Alternatively, if the touch inputs are received corresponding to the plurality of pens 2, the display apparatus 1a or 1b may increase the sensing section more than that of when the touch input is received corresponding to one pen 2, to identify each of the pens 2 and determine the positions of the identified pens 2.

Alternatively, the display apparatus 1a or 1b may increase or keep the sensing section if the touch input is frequently made based on frequency of receiving the touch input, and decrease the sensing section while no touch inputs are made.

Alternatively, the display apparatus 1a or 1b may adjust the sensing section in accordance with the kinds of touch input. For instance, the display apparatus 1a or 1b may increase the sensing section for sensing the touch input based on the finger 10 if the touch input is made by a user's finger 10, and increase the sensing section for sensing the touch input based on the pen 2 if the touch input is made by the pen 2. Further, the sensing section for sensing the touch input based on the pen 2 may be adjusted according to whether only the position of the pen is sensed, or the identification information, pen-pressure information and the like additional information of the pen 2 are sensed.

Alternatively, the display apparatus 1a or 1b may adjust the sensing section in accordance with precision required in sensing the touch input. For example, the display apparatus 1a or 1b increases the sensing section if higher precision is required in sensing the touch input, but decreases the sensing section if lower precision is required. The precision required in sensing the touch input may mean a time needed for analyzing a pen signal received from the pen 2. For example, relatively low precision is required to determine only whether the pen signal from the pen 2 is received at a specific position. To distinguish the pen 2 from another pen 2 based on a unique frequency of a received pen signal, precision higher than that of determining only whether the pen signal is received may be required. Further, to determine whether the frequency of the received pen signal is shifted, precision higher than those of determining whether the pen signal is received or determining the unique frequency of the pen signal may be required.

Alternatively, the display apparatus 1a or 1b may adjust the sensing section in accordance with whether an application or function related to the touch input is activated or inactivated. For example, if the display apparatus 1a or 1b identifies the plurality of pens 2 and provides different functions respectively corresponding to the pens 2, the sensing section may be increased to identify the respective pens 2. If these functions are inactivated, the sensing section may be decreased. Further, if a function or an application of providing different functions according to the pen pressure of the pen 2 is activated, the sensing section may be increased to precisely sense the pen pressure of the pen 2. On the other hand, if this function is inactivated, the sensing section may be decreased.

Alternatively, the display apparatus 1a or 1b may modify the sensing section in response to an adjusting command input by a user.

According to example embodiments, the display apparatus 1a or 1b adjusts the sensing section for sensing the touch input to more precisely sense the touch input as necessary or shorten a touch detecting time, thereby improving a response speed to a user's touch and enhancing usability.

Below, the display apparatus 1a or 1b will be described in greater detail.

Figure 2:
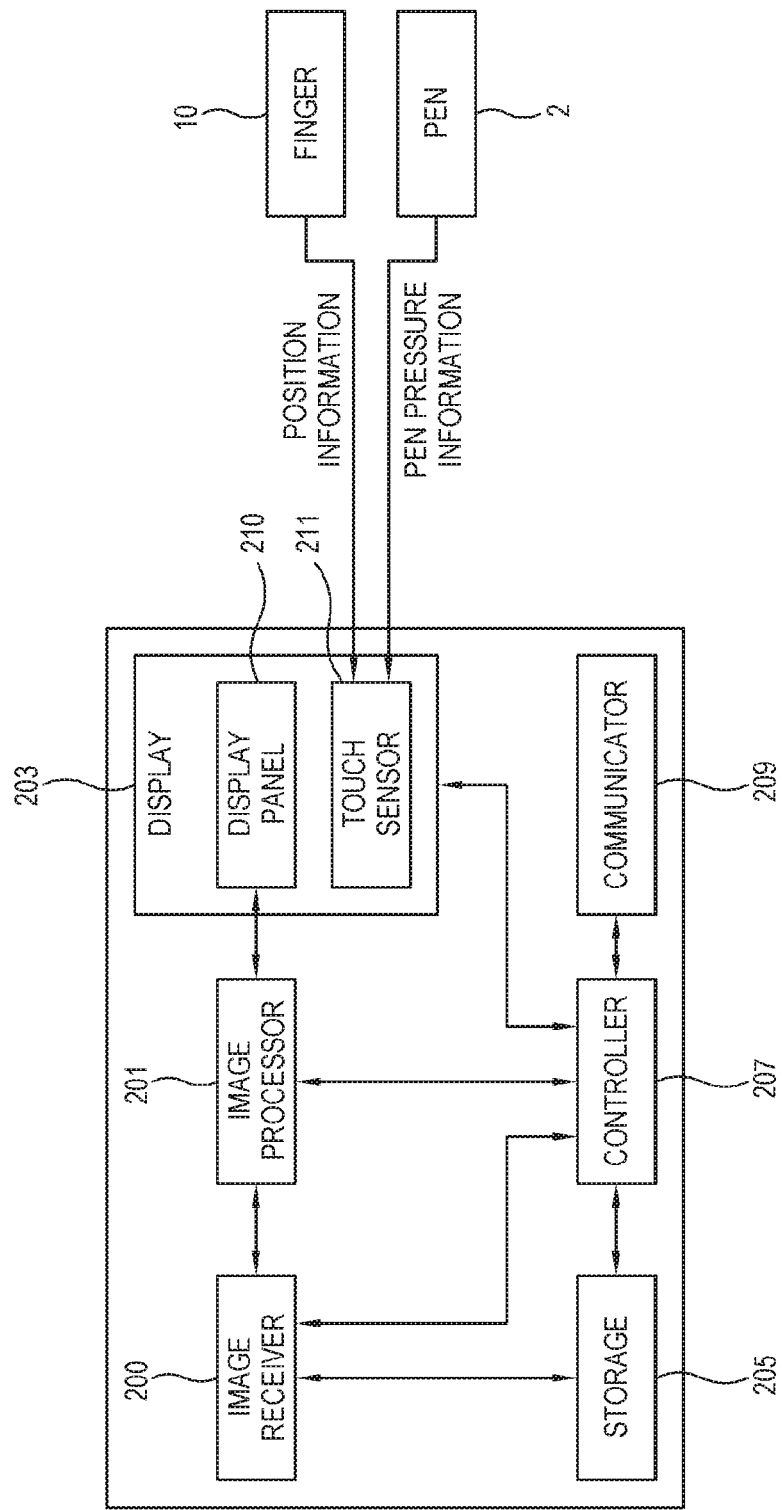
FIG. 2 is a block diagram illustrating an example display apparatus according to an example embodiment.

FIG. 2 is a block diagram illustrating an example display apparatus according to an example embodiment.

The display apparatus 1 includes a display 203 and a controller (e.g., including processing circuitry) 207. The display apparatus 1 may further include at least one of an image receiver (e.g., including image receiving circuitry) 200, an image processor (e.g., including image processing circuitry) 201, a storage 205 and a communicator (e.g., including communication circuitry) 209. The elements of the display apparatus 1 according to an example embodiment illustrated in FIG. 2 are provided merely as an example. The display apparatus 1 according to an example embodiment may have different elements from those shown in FIG. 2. For example, the display apparatus 1 according to an example embodiment may include an element in addition to the elements shown in FIG. 2, or exclude an element from the elements shown in FIG. 2.

The image receiver 200 may include various image receiving circuitry and receives an image signal from the outside. The image receiver 200 may include a tuner for receiving the image signal. The tuner may be tuned to a channel selected by a user among a plurality of channels and receive a broadcast signal corresponding to the selected channel. The image receiver 200 may also receive an image signal from an image processing device such as a set-top box, a digital versatile disc (DVD), a PC, or the like; a mobile device such as a smart phone; or a server through the Internet, but is not limited thereto.

The image processor 201 may include various image processing circuitry and applies an imaging process to the image signal received in the image receiver 200, and outputs the image signal subject to the imaging process so that the display 203 can display an image based on the image signal. The imaging process performed by the image processor 201 may for example include demultiplexing for dividing a transport stream including an image signal into sub streams of a video signal, an audio signal and appendix data; de-interlacing for converting an interlaced-type image signal into a progressive-type image signal; scaling for adjusting a resolution of an image signal; noise reduction for improving quality of an image; detail enhancement; frame refresh rate conversion; etc.

The display 203 displays an image based on the image signal processed by the image processor 201, and senses a user's touch input as described above. The display 203 may include a display panel 210 for displaying an image and a touch sensor 211 for sensing a touch input. There are no limits to the type of display panel 210, and the display panel 210 may be for example achieved by various display types such as liquid crystal, plasma, a light-emitting diode, an organic light-emitting diode, a surface-conduction electron-emitter, a carbon nano-tube, nano-crystal, or the like, but is not limited thereto.

If the display panel 210 is the type of liquid crystal, the display 203 includes a liquid crystal display panel 210, a backlight unit for emitting light to the liquid crystal display panel 210, a panel driving substrate for driving the liquid crystal display panel, etc. The display 203 may be achieved by a self-emissive organic light emitting diode (OLED) panel 210 without the backlight unit.

The touch sensor 211 senses a touch input corresponding to a user's finger 10 or the pen 2 within an assigned sensing section. The touch sensor 211 may be provided in the entire surface of the display 203 where an image is displayed. The touch sensor 211 may include transparent electrodes arranged in a matrix form on the display panel 210 and a circuit for sensing capacitance. The touch sensor 211 may have a GFF or G2 structure using the transparent electrodes such as indium tin oxide (ITO), a metal mesh, an Ag nano wire, etc. or a structure of a flexible printed circuit board (FPCB) where an opaque and flexible film is used as a substrate and a conductive material is oriented thereon. According to an example embodiment, there are no limits to the structure of the touch sensor 211. The touch sensor 211 not only senses a position touched by the finger 10 or the pen 2 but also identifies the pen 2 based on a unique frequency embedded in a pen signal of the pen 2. In addition, the touch sensor 211 may identity various pieces of information such as a level of pen pressure applied to the pen 2, a moving speed of the pen 2, a time for which the touch input is made, other additional input commands, etc. based on how much the frequency of the pen signal is shifted.

The touch sensor 211 may sense the touch input within the assigned sensing section, and adjust the sensing section under control of the controller 207. The touch sensor 211 may adjust the sensing section by increasing or decreasing the length of the sensing section, or increasing or decreasing the number of sensing sections within a unit time. The unit time may for example refer to a time taken in scanning the whole area of the display panel, and be represented in units of frame.

The storage 205 is configured to store various pieces of data of the display apparatus 1. The storage 205 may be achieved by a nonvolatile memory (or a writable read only memory (ROM)) which retains data even though the display apparatus 1 is powered off, and reflects changes. That is, the storage 205 may be achieved by one of a flash memory, an erasable and programmable read only memory (EPROM) and an electrically erasable and programmable read only memory (EEPROM).

The storage 205 may further include a volatile memory which maintains data only while the display apparatus 1 is powered off. That is, the storage 205 may include either of a dynamic random access memory (DRAM) or a static random access memory (SRAM) which reads recorded information and has a higher reading or writing speed of the electronic apparatus 1 than the nonvolatile memory.

The communicator 209 may include various communication circuitry and communicates with an external apparatus. The communicator 209 may be variously materialized according to the types or the like of external apparatus or display apparatus 1. For example, the communicator 209 includes a connecting unit for wired communication, and the connecting unit transmits/receives a signal/data according to standards such as high definition multimedia interface (HDMI), HDMI-consumer electronics control (CEC), a universal serial bus (USB), Component, etc., and includes at least one connector or terminal corresponding to each of these standards. The communicator 209 may perform the wired communication with a plurality of servers through a local area network (LAN).

The communicator 209 may further various elements in accordance with designs of the display apparatus 1 in addition to the connecting unit having the connector or terminal. As an example of various elements, the communicator 209 may include a radio frequency (RF) circuit for transmitting and receiving an RF signal to perform the wireless communication with the external apparatus, and perform one or more communications among wireless fidelity (Wi-Fi), Bluetooth, Zigbee, ultra-wide band (UWB), wireless universal serial bus (USB), and near field communication (NFC).

The controller 207 may include various processing circuitry and performs control for operating general elements of the display apparatus 1. The controller 207 may include a control program for implementing such control, a nonvolatile memory in which the control program is installed, a volatile memory to which the installed control program is at least partially loaded, and, for example, and without limitation, at least one microprocessor or central processing unit (CPU) for executing the loaded control program. The control program may include program(s) achieved in the form of at least one among a basic input/output system (BIOS), a device driver, an operating system (OS), a firmware, a platform, and an application program. According to an example embodiment, the control program may be previously installed or stored in the display apparatus 1 when the display apparatus 1 is manufactured, or installed later in the display apparatus 1 based on data of an application program received from the outside when it is needed. The data of the application program may be for example downloaded from an application market and the like external server to the display apparatus 1.

According to an example embodiment, the controller 207 performs a function based on a position of a sensed touch input if the touch input is sensed in the touch sensor 211. The controller 207 may perform a corresponding function based on the identification (ID) information of the pen 2, the strength of the touch input, the speed of the touch input, the time for which the input is made, other additional commands, etc.

In this example embodiment, the controller 207 determines whether a condition for adjusting a sensing section assigned to sense a touch input is satisfied, and controls the touch sensor 211 to adjust the sensing section based on the determination. The controller 207 may increase the sensing section to more precisely sense the touch input, or decrease the sensing section in order to quickly sense the touch input. As described above, the controller 207 adjusts the sensing section based on various conditions such as how close the touch input means such as the finger 10, the pen 2, etc. is to the display panel 210, the number, frequency and kind of the touch inputs, precision required in sensing the touch input, whether an application and a function is activated or inactivated, a user's adjustment command, etc.

According to an example embodiment, the sensing section includes a plurality of sensing sections (refer to '1210' and '1211' of FIG. 12). For example, the sensing section may include first sensing section 1210 assigned for sensing a plurality of frequencies of touch inputs distributed at first intervals, and a second sensing section 1211 assigned for sensing a frequency shifted by a second interval shorter than the first interval from the plurality of frequencies. For example, the plurality of pens 2 are different in unique frequency of each pen signal from each other by the first interval, and the unique frequency is shifted as much as the second interval by the pen pressure or the like of the pen 2. The touch sensor 211 senses a touch input within the first sensing section 1210 to determine the positions touched with the plurality of pens 2 and identify each pen 2, and sense the shift of the frequency of the pen signal received from each pen 2 within the second sensing section 1211.

The controller 207 may adjust at least one of the first sensing section 1210 and the second sensing section 1211 based on the foregoing conditions. For example, if the touch inputs are made by the plurality of pens 2, the pen signals respectively output from the pens 2 may interfere with each other. The interference may have an effect on sensing the frequency shift in the touch sensor 211, and therefore the controller 207 may increase the second sensing section to precisely sense the frequency shift when the touch inputs are made by the plurality of pens 2

Figure 3:
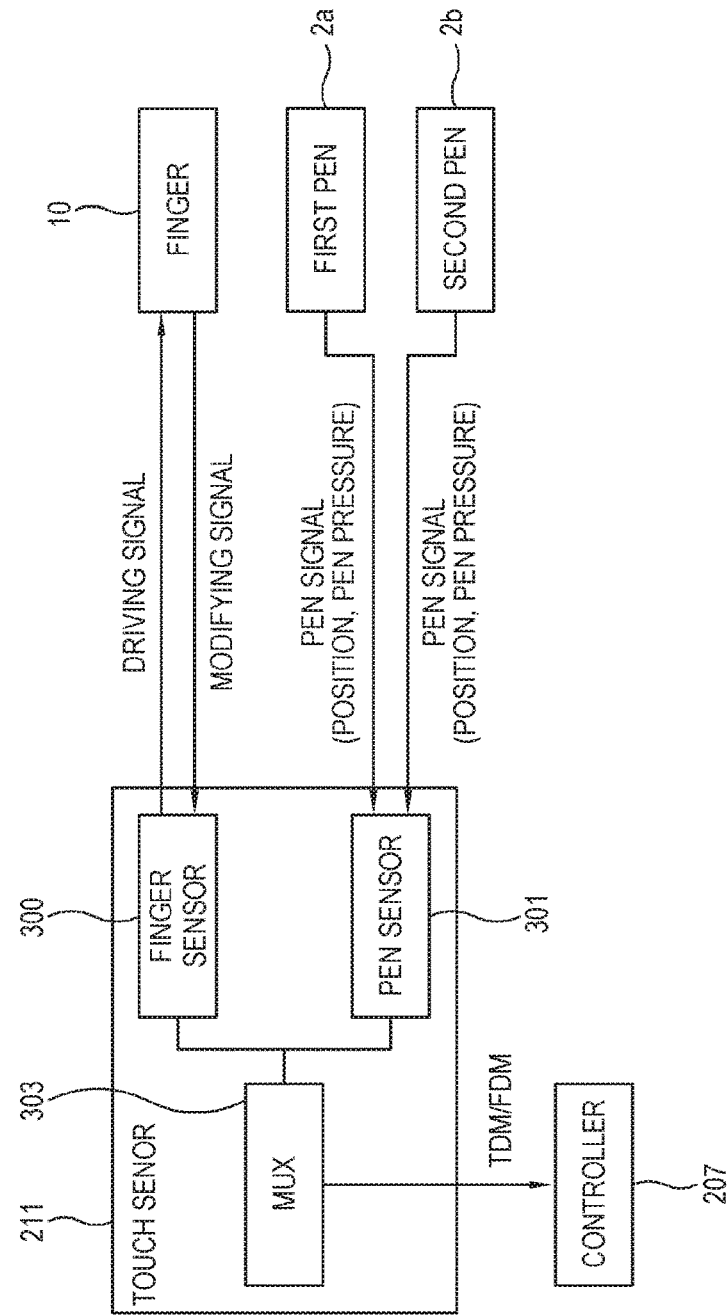
FIG. 3 is a block diagram illustrating an example touch sensor according to an example embodiment.

FIG. 3 is a block diagram illustrating an example touch sensor according to an example embodiment.

The touch sensor 211 may include a finger sensor 300, a pen sensor 301 and a mupliplexer (MUX) 303.

The finger sensor 300 senses a position touched by a finger based on change in capacitance of an electrode after the touch. The capacitance includes self-capacitance and mutual capacitance. The finger sensor 300 supplies a driving signal to the electrode of the display panel 210, detects change in capacitance, e.g., a changed driving signal between before and after the touch of the touch sensor in sync with the driving signal, and converts the change into digital data.

The pen sensor 301 receives pen signals from pens 2a and 2b. The pen sensor 301 converts the pen signals of the pens 2a and 2b into digital data and measures the intensity of the pen signal. The pen sensor 301 compares the intensity of the received pen signal with a reference level, and determines touch position information of the pens 2a and 2b. The pen sensor 301 determines a position, in which the intensity of the pen signal is higher than the reference level, as a touch position. Alternatively, the pen sensor 301 may determine a position, in which the intensity of the pen signal is relatively higher than those of signals received at surrounding positions, as the touch position. The pen sensor 301 may determine the pen 2a or 2b, which transmits the pen signal, among the plurality of pens 2a and 2b based on the frequency of the received pen signal.

Further, the pen sensor 301 may sense various pieces of additional information such as the pen pressure of the pen 2a or 2b and the moving speed of the pen, etc. based on how much the received pen signal is shifted. It will be described later that the pens 2a and 2b are identified and the additional information is sensed.

The MUX 303 multiplexes the information of the digital data sensed and converted by the finger sensor 300 and the pen sensor 301, and transmits the multiplexed signal to the controller 207. The multiplexing may be performed based on at least one of time division multiplexing (TDM) and frequency division multiplexing (FDM). According to an example embodiment, the MUX 303 assigns the touch input from the finger 10 and/or the plurality of pens 2a and 2b to channels divided by a plurality of frequency bands, and transmits the signals corresponding to the plurality of channels. According to this example embodiment, the plurality of pens 2a and 2b is assigned to the channels according to unique frequency characteristics of the pen signals output from the pens 2a and 2b, and the finger 10 is assigned to the channel having a frequency band not overlapped with those of the pens 2a and 2b, thereby performing the FDM.

Alternatively, the MUX 303 may assign the touch input of the finger 10 and the touch inputs of the pens 2a and 2b to certain periods of time and transmits the signal sensed for each assigned time.

Figure 4:
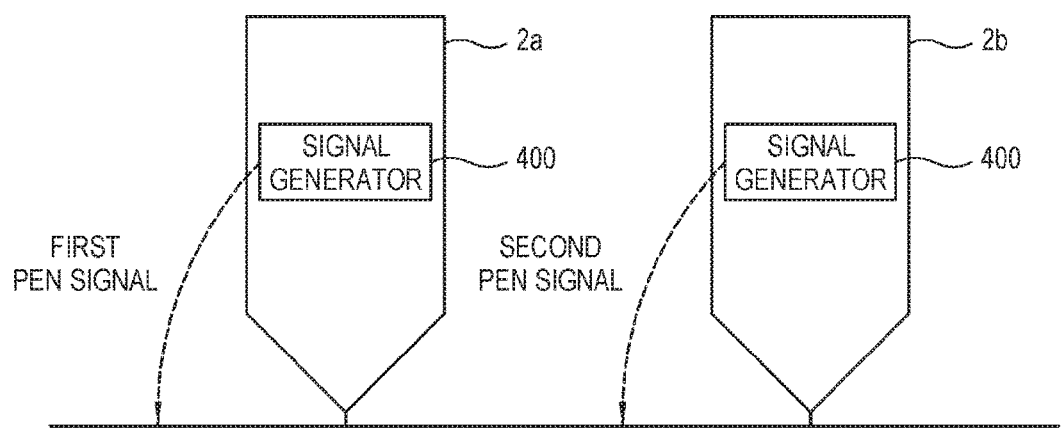
FIG. 4 is a diagram illustrating an example of receiving touch inputs based on a plurality of pens according to an example embodiment.
Figure 5:
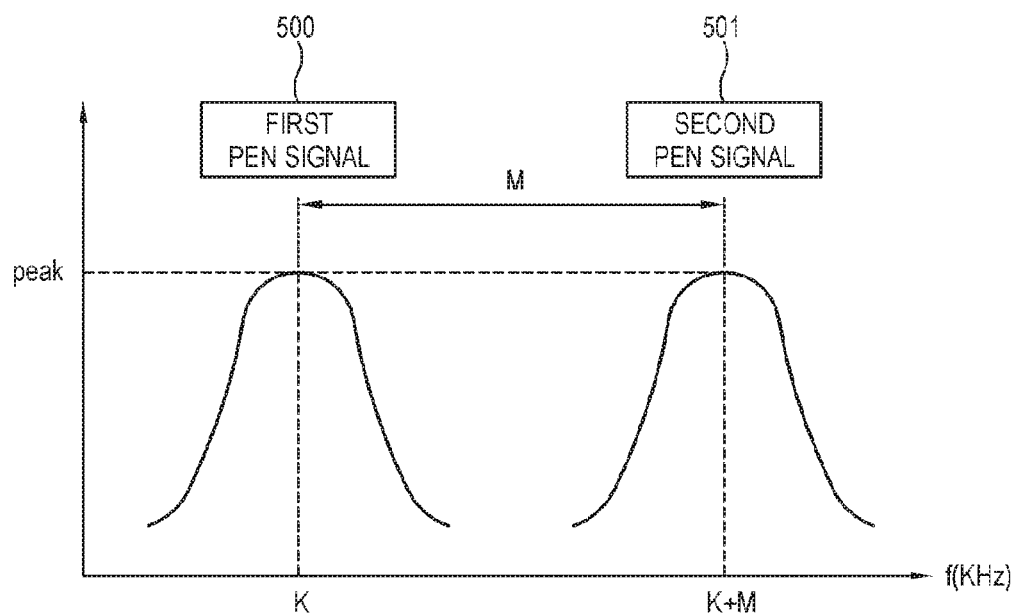
FIG. 5 is a diagram illustrating example waveforms of pen signals received from the plurality of pens shown in FIG. 4 with respect to a frequency domain.

FIG. 4 is a diagram illustrating an example of receiving touch inputs based on a plurality of pens according to an example embodiment, and FIG. 5 is a diagram illustrating example waveforms of pen signals received from the plurality of pens shown in FIG. 4 with respect to a frequency domain.

The display apparatus 1 senses the touch inputs based on the pen signals received from the plurality of pens 2a and 2b, and performs a function based on the sensed touch input. The pens 2a and 2b include signal generators (e.g., including signal generating circuitry) 400 for generating the pen signals. The generated pen signal has a unique frequency for each of the pens 2a and 2b. Referring to FIG. 4, the signal generators 400 of two pens 2a and 2b output a first pen signal and a second pen signal, which have their own unique frequencies different from each other, to the display apparatus 1, respectively.

FIG. 5 illustrates example waveforms of the pen signals 500 and 501 of the pens 2a and 2b, respectively. A first pen signal 500 output from the first pen 2a has a frequency of K at the peak, and a second pen signal 501 output from the second pen 2b has a frequency of K+M at the peak. That is, the first pen signal 500 and the second pen signal 501 are different in frequency as much as 'M'. If a touch input is made by a third pen, the third pen has a frequency of K+nM, which is different from the frequencies of the first pen and the second pen as much as a multiple of 'M'. As mentioned above, the touch sensor 211 compares the intensities of the pen signals 500 and 501 with the reference level when the pen signals 500 and 501 are received, or compares them with the intensities of the signals received at the surrounding positions, thereby determining positions, in which the pen signals 500 and 501 have higher intensities than the reference level or the intensities of the surrounding signals, as the touch positions. The touch sensor 211 identifies the pens 2a and 2b based on the frequencies at the peaks of the pen signals 500 and 501. The controller 207 performs a function based on the position of the touch input received from the touch sensor 211 and the identification information of the pens 2a and 2b.

The accompanying drawings and the foregoing descriptions simply provided as an example, and do not limit the present disclosure. There may be various embodiments for identifying the pens 2a and 2b when receiving the touch inputs from the plurality of pens 2a and 2b.

Figure 6:
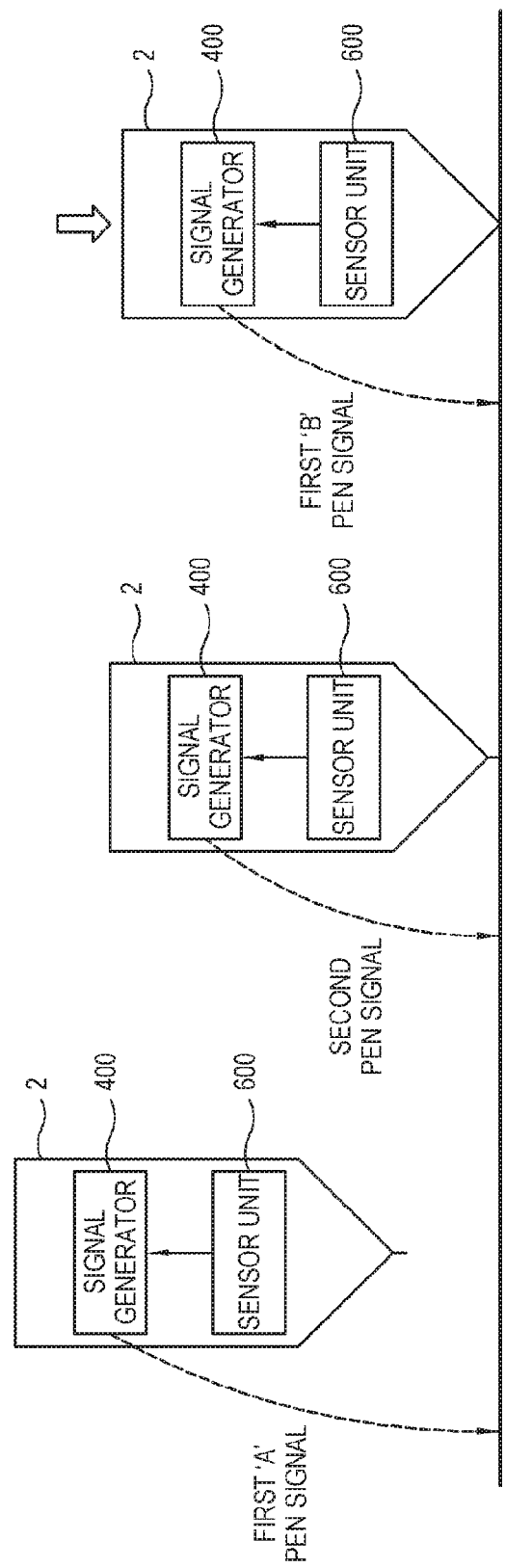
FIG. 6 is a diagram illustrating an example of various touch characteristics of the pen according to an example embodiment.
Figure 7:
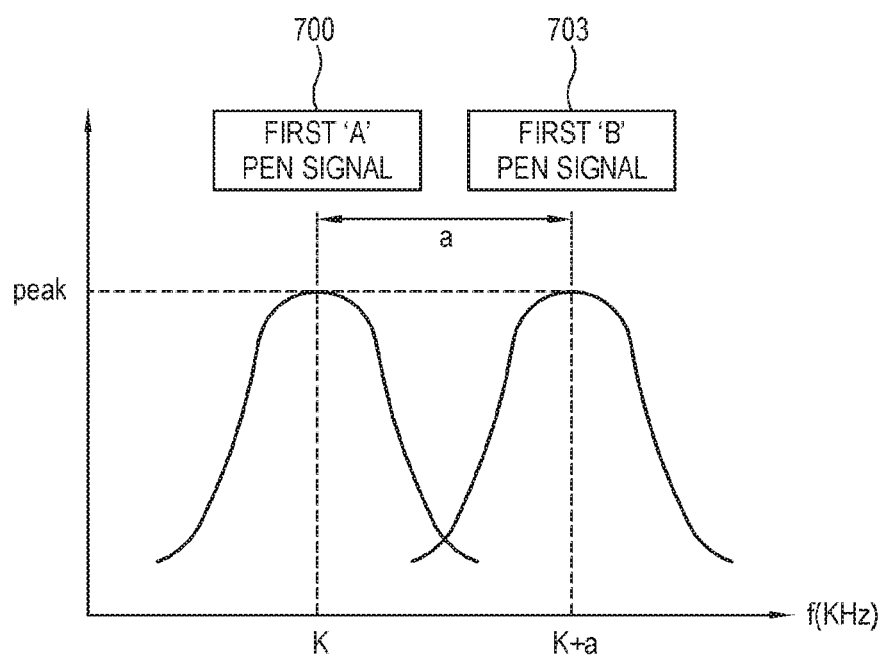
FIG. 7 is a diagram illustrating example waveforms of pen signals received with respect to a frequency domain according to various touch characteristics of the pens shown in FIG. 6.

FIG. 6 is a diagram illustrating an example of various touch characteristics of the pen according to an example embodiment, and FIG. 7 illustrates example waveforms of pen signals received according to various touch characteristics of the pens shown in FIG. 6 with respect to a frequency domain.

The pen 2 may further include a sensor unit (e.g., including sensor circuitry) 600 for sensing a touch state of the pen 2. Referring to FIG. 6, the touch state of the pen 2 may for include a state where the pen 2 is separated at a predetermined distance from the touch panel of the display apparatus 1 (the left side in FIG. 6), a state where the pen 2 is in just contact with the surface of the touch panel (the center in FIG. 6), and a state where the pen 2 is in contact with the touch panel and pressed by predetermined pressure in a direction toward the touch panel (the right side in FIG. 6). The sensor unit 600 may for example sense variation in pressure applied to a front end of the pen 2 and output a sensing value corresponding to the touch state of the pen 2. The signal generator 400 may shift the frequency of the output pen signal based on the sensing value of the sensor unit 600. For example, in the state that the pen 2 is separated at a predetermined distance from the touch panel of the display apparatus 1, the signal generator 400 outputs a first 'a' pen signal since no pressure is applied to the front end of the pen 2. Likewise, in the state that the pen 2 is in just contact with the surface of the touch panel, the signal generator 400 outputs the first 'a' pen signal since little pressure is applied to the front end of the pen 2 and thus there are no substantial differences from the state where the pen 2 is separated from the touch panel. On the other hand, in the state that the pen 2 is in contact with the touch panel of the display apparatus 1 and pressed by predetermined pressure in the direction toward the touch panel, the signal generator 400 outputs a first 'b' pen signal having a frequency shifted corresponding to increment of the pressure applied to the front end of the pen 2 as compared with the frequency of the first 'a' pen signal.

According to an example embodiment, the sensor unit 600 may include various sensor circuitry, such as, for example, and without limitation, a variable capacitor included in an RC or LC resonance circuit of the signal generator 400, and varied in capacitance depending on how strong the front end of the pen 2 is pressed. As the capacitance is varied, the frequency generated in the RC or LC resonance circuit of the signal generator 400 is minutely shifted, and the display apparatus 1 performs a function corresponding to change in the touch characteristics of the pen 2 sensed based on the shifted frequency of the pen signal.

FIG. 7 is a diagram illustrating examples of the touch characteristic waveforms of the pen signals 700 and 703, the frequencies of which are shifted according to the touch characteristics of the pen 2. The signal generator 400 generates the first 'a' pen signal 700 when the pen 2 is separated at a predetermined distance from or is in just contact with the touch panel of the display apparatus 1. On the other hand, the signal generator 400 generates the first 'b' pen signal 703 increased in frequency as much as 'a' from the first 'a' pen signal 700 in the state that the pen 2 is in contact with the touch panel of the display apparatus 1 and pressed by predetermined pressure in the direction toward the touch panel. The display apparatus 1 senses that the frequencies of the pen signals 700 and 703 are shifted, and determines the changed touch characteristics of the pen 2 such as the pen pressure, speed, angle, etc. based on the shifted frequency, thereby performing the function corresponding to the determined touch characteristics.

However, the present disclosure is not limited to the accompanying drawings and the foregoing descriptions. The frequency may be shifted according to the touch characteristics of the pen 2. For example, if the pen 2 moves closer to and pressed stronger against the display apparatus 1, the signal generator 400 may stepwise increase the frequency of the pen signal.

Alternatively, the sensor unit 600 may sense various touch characteristics such as a moving speed, an input time, etc. of the pen 2, and the signal generator 400 may shift the frequency of the pen signal based on various sensed touch characteristics.

In addition, the pen 2 may further include a user command input such as a button on an outer side thereof. The signal generator 400 may additionally shift the frequency of the pen signal in response to the button pressed by a user for additionally performing a function.

The accompanying drawings and the foregoing descriptions are just given as an example, and are not construed as limiting the present disclosure. According to an example embodiment, various touch characteristics of the pen 2 are sensed, and various functions are performed based on the sensed touch characteristics.

Below, the functions performed in the display apparatus 1 according to the touch characteristics of the pen 2 will be described in greater detail with reference to the accompanying drawings.

Figure 8:
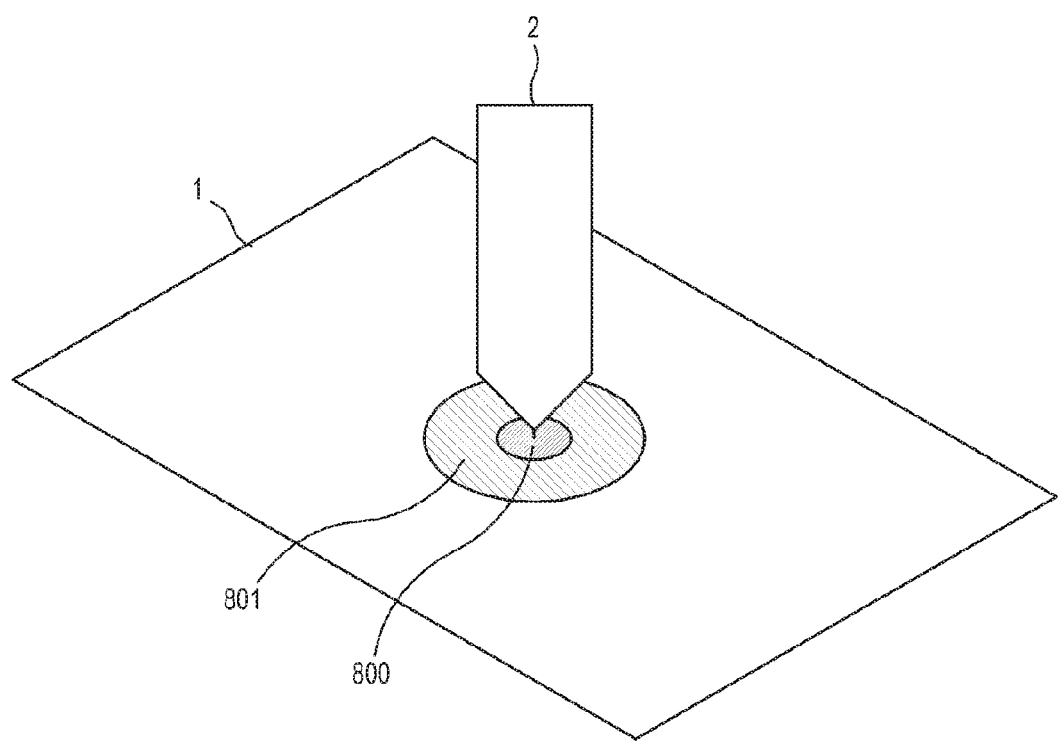
FIG. 8 is a diagram illustrating an example of various functions performed by the display apparatus in accordance with various touch characteristics according to an example embodiment.
Figure 9:
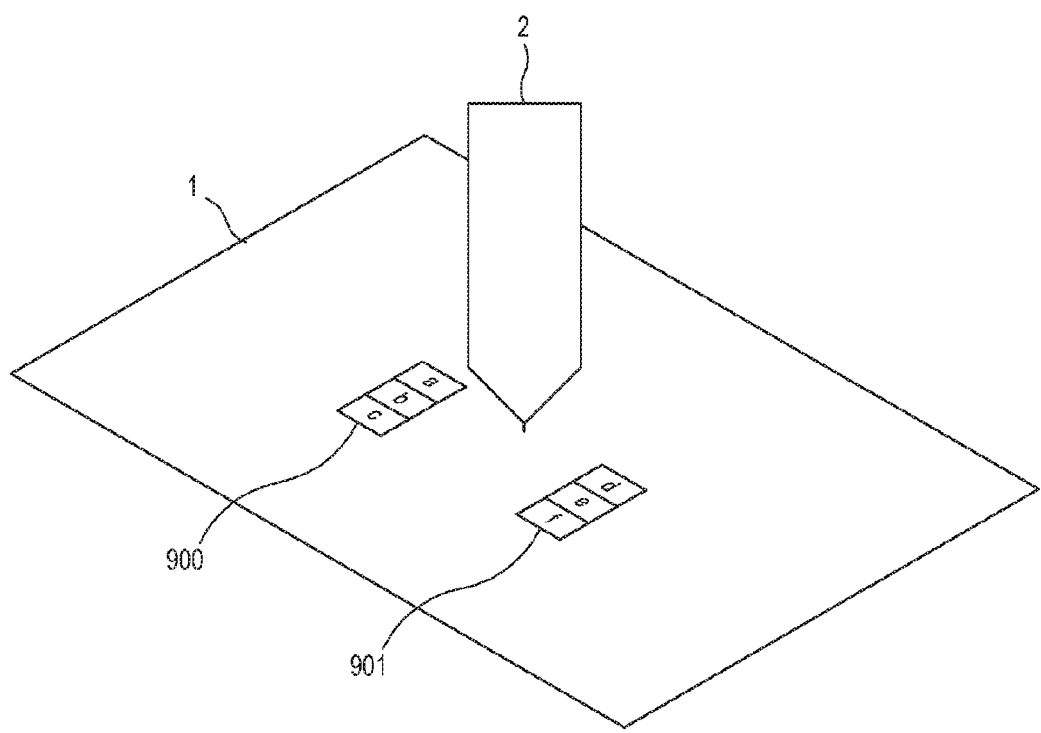
FIG. 9 is a diagram illustrating an example of various functions performed by the display apparatus in accordance with various touch characteristics according to an example embodiment.

FIGS. 8 and 9 are diagrams illustrating examples of various functions performed by the display apparatus according to an example embodiment in accordance with various touch characteristics of the pen.

When the pen 2 contacts the display apparatus 1, the display apparatus 1 may change an image displayed at a position where the contact of the pen 2 occurs. For example, the display apparatus 1 may perform a function of drawing a line or moving a pointer on a displayed image along a direction where the contact pen 2 moves.

The display apparatus 1 determines the touch characteristics of the pen 2 in accordance with how much the frequency of the pen signal output from the pen 2 is shifted, and performs the function corresponding to the touch characteristics of the pen 2.

Referring to FIG. 8, the display apparatus 1 displays a circle 800 at a position where the contact with the pen 2 occurs. Then, the display apparatus 1 may display another circle 801 larger than the first circle 800 as the pressure applied to the pen 2 becomes stronger.

Referring to FIG. 9, the display apparatus 1 displays a user interface (UI) involving a plurality of menu items 900 at a position where the contact with the pen 2 occurs. Then, the display apparatus 1 may display another menu item 901 as the pressure applied to the pen 2 becomes larger.

Since the accompanying drawings and the foregoing descriptions are merely provided as an example, the display apparatus 1 may for example perform various functions based on various conditions such as a moving speed of the pen 2, a contact angle of the pen 2, a touch time of the pen, a button input of the pen 2, etc.

Figure 10A:
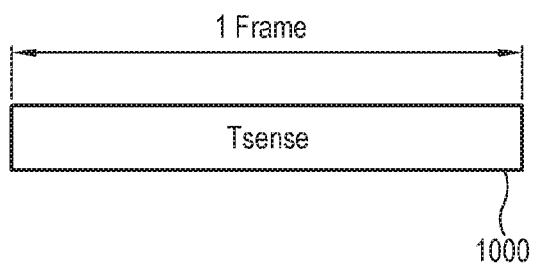
FIGS. 10A, 10B and 10C are diagrams illustrating an example of modifying the sensing section according to an example embodiment.
Figure 10B:
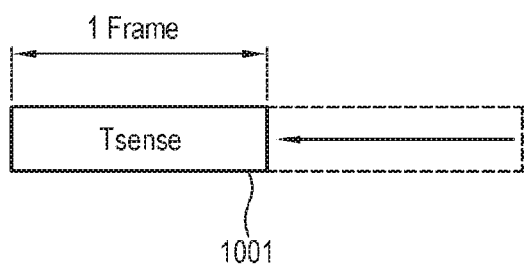
Figure 10C:
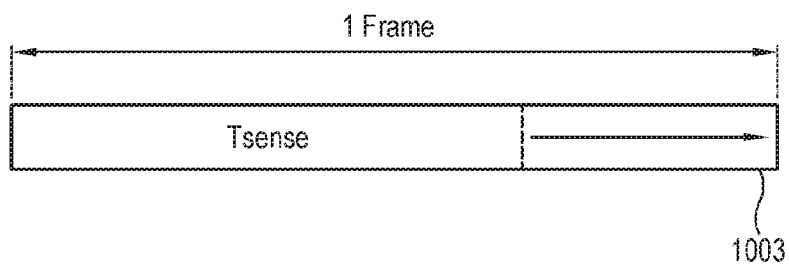

FIGS. 10A, 10B and 10C are diagrams illustrating an example of modifying the sensing section according to an example embodiment.

As described above, the touch sensor 211 senses a touch input for the assigned sensing section, and the controller 207 controls the touch sensor 211 to adjust the sensing section in accordance with conditions for adjusting the sensing section. For example, the touch sensor 211 scans the electrodes on the display panel 210 within the sensing section. The touch sensor 211 scans the entire screen for 1 frame or a unit time, and the unit time may include a plurality of sensing sections.

For example, the touch sensor 211 senses whether a touch input is made in one area among a plurality of areas obtained by dividing the display panel 210 within one sensing section.

Figure 11A:
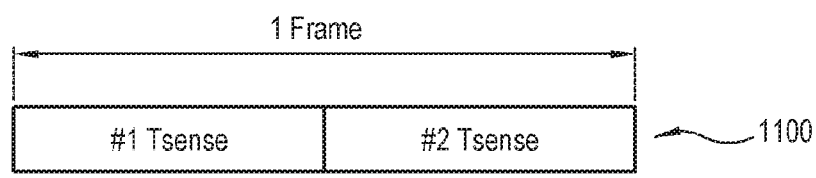
FIGS. 11A and 11B are diagrams illustrating an example of modifying the plurality of sensing sections according to an example embodiment.
Figure 11B:
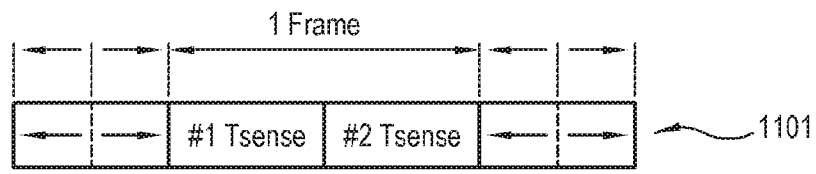

FIGS. 10A, 10B and 10C illustrate an example that one frame is adjusted by modifying the sensing section, and FIGS. 11A and 11B are diagrams illustrating an example of modifying each of the plurality of sensing sections.

Referring to FIG. 10A, the reference numeral '1000' indicates a sensing section before modification, the reference numeral '1001' in FIG. 10B indicates a shortened sensing section, and the reference numeral '1003' in FIG. 10C indicates a prolonged sensing section. As the sensing section is shortened and prolonged, time taken corresponding to one frame decreases and increases. That is, the touch sensor 211 more precisely senses the touch input or quickly detects the touch input as the unit time of sensing the touch input increases.

FIGS. 11A and 11B are diagrams illustrating an example in which the controller 207 respectively modifies a plurality of sensing sections with respect to a plurality of touch inputs. Referring to FIG. 11A, the reference numeral '1100' indicates a plurality of sensing sections before modification, the reference numeral '1101' of FIG. 11B indicates that the plurality of sensing sections are respectively modified to change time taken corresponding to one frame. If a plurality of touch inputs is made, the touch sensor 211 may sense the plurality of touch inputs within the sensing section assigned to each touch input. For example, the touch sensor 211 senses position and identification information about each of the plurality of touch inputs within a first sensing section, and senses the touch characteristics of the plurality of touch inputs within a second sensing section. The controller 207 may control the touch sensor 211 to adjust at least one of the first sensing section and the second sensing section as the condition for the sensing section is satisfied.

FIGS. 12A, 12B and 12C are diagrams illustrating an example of modifying the length and number of sensing sections within unit time according to an example embodiment. Referring to FIG. 12A, the reference numeral '1200' indicates one frame before adjusting the sensing section, the reference numeral '1201' of FIG. 12B indicates an example that the sensing section is adjusted by modifying the length of the second sensing section 1211, and the reference numeral '1203' of FIG. 12C indicates an example that the sensing section is adjusted by modifying the number of second sensing sections 1211.

The touch sensor 211 senses a touch input by scanning the entire screen during one frame or for the unit time. The screen is divided into a plurality of areas, and the touch sensor 211 senses a touch input within one area within one sensing section. FIGS. 12A, 12B and 12C illustrate an example of adjusting the sensing section in an embodiment where N sensing sections comprise one frame in case of N areas. One frame during which the touch sensor 211 scans N areas include N sensing sections, and each the sensing section includes the first sensing section 1210 and the second sensing section 1211.

The controller 207 may increase or decrease the first sensing section 1210 and/or the second sensing section 1211 under various conditions that a plurality of touch inputs is received, at least one of functions and applications related to the touch characteristics of the sensed pen 2 is activated/inactivated, etc. According to an example embodiment, the touch sensor 211 may increase the second sensing section 1211 to precisely detect the shift of the frequency and sense the touch characteristics. According to another example embodiment, the touch sensor 211 may decrease the sensing section to improve the speed of sensing the touch input. To decrease the sensing section the touch sensor 211 may minimize the second sensing section 1211 for sensing only whether the characteristics of the touch input are changed.

Referring to the reference numeral '1201' in FIG. 12B, the controller 207 decreases the length of the second sensing section 1211 in each area, thereby adjusting the sensing section. Alternatively, the controller 207 increases or decreases the length of the first sensing section 1210 and/or the second sensing section 1211 assigned to at least some areas among the plurality of areas corresponding to the sensing section, thereby adjusting the sensing section.

Referring to the reference numeral 1203 in FIG. 12C, it is illustrated that the sensing section is adjusted by modifying the number of sensing sections within one frame. The controller 207 does not assign the second sensing section 1211 to the areas 1.about.N−1, but assigns it to only an additional area, e.g., the area N, thereby decreasing the sensing section. For example, the controller 207 divides the display panel into N−1 areas, and assigns the first sensing section 1210 to all the areas, thereby sensing the touch input. The second sensing section 1211 is assigned to short time to simply check whether the touch characteristics are changed or not. Then, if it is determined that the characteristics of the touch inputs are changed within the second sensing section 1211, the sensing section is adjusted by increasing the length of the second sensing section 1211 or increasing the number of second sensing sections 1211.

Alternatively, the controller 207 may complexly adjust the length and number of sensing sections 1210 and 1211. For example, the controller 207 increases the sensing section 1210 or 1211 corresponding to the area where the touch input is received but decreases the sensing section 1210 or 1211 corresponding to the area where the touch input is not received, or does not assign a certain sensing section 1210 or 1211 to a specific area, etc. Like this, the controller 207 may adjust the length of each sensing section 1210 or 1211 and the number of sensing sections 1210 or 1211 differently according to the areas.

Figure 13:
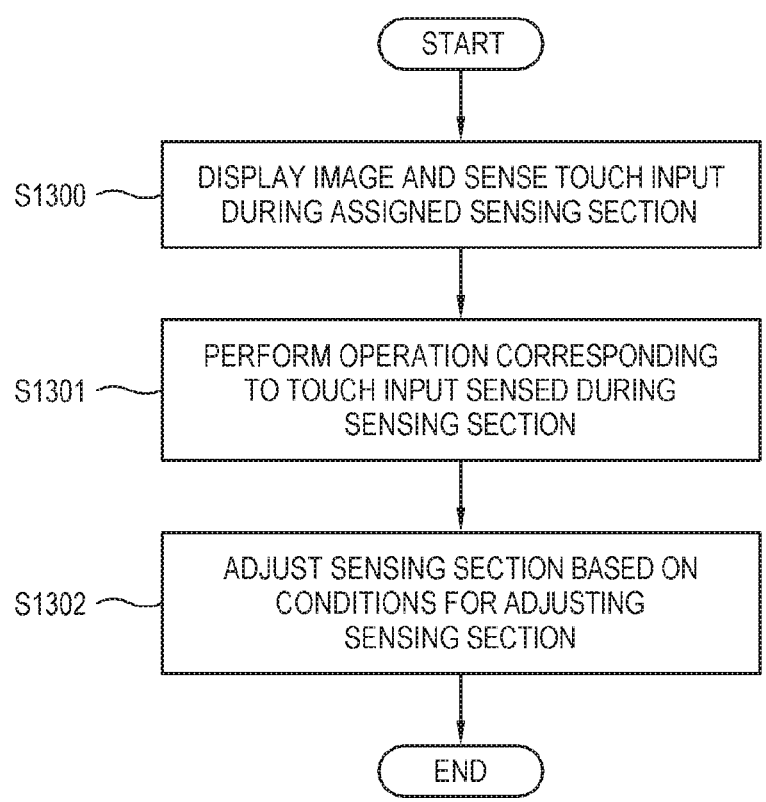
FIG. 13 is a flowchart illustrating an example method of controlling the display apparatus according to an example embodiment.

FIG. 13 is a flowchart illustrating an example method of controlling the display apparatus according to an example embodiment.

At operation S1300, the display apparatus 1 displays an image and senses a touch input within an assigned sensing section while displaying an image. At operation S1301, the display apparatus 1 performs a function corresponding to a touch input sensed within the sensing section. At operation S1302, the display apparatus 1 adjusts the sensing section based on conditions for adjusting the sensing section.

Figure 14:
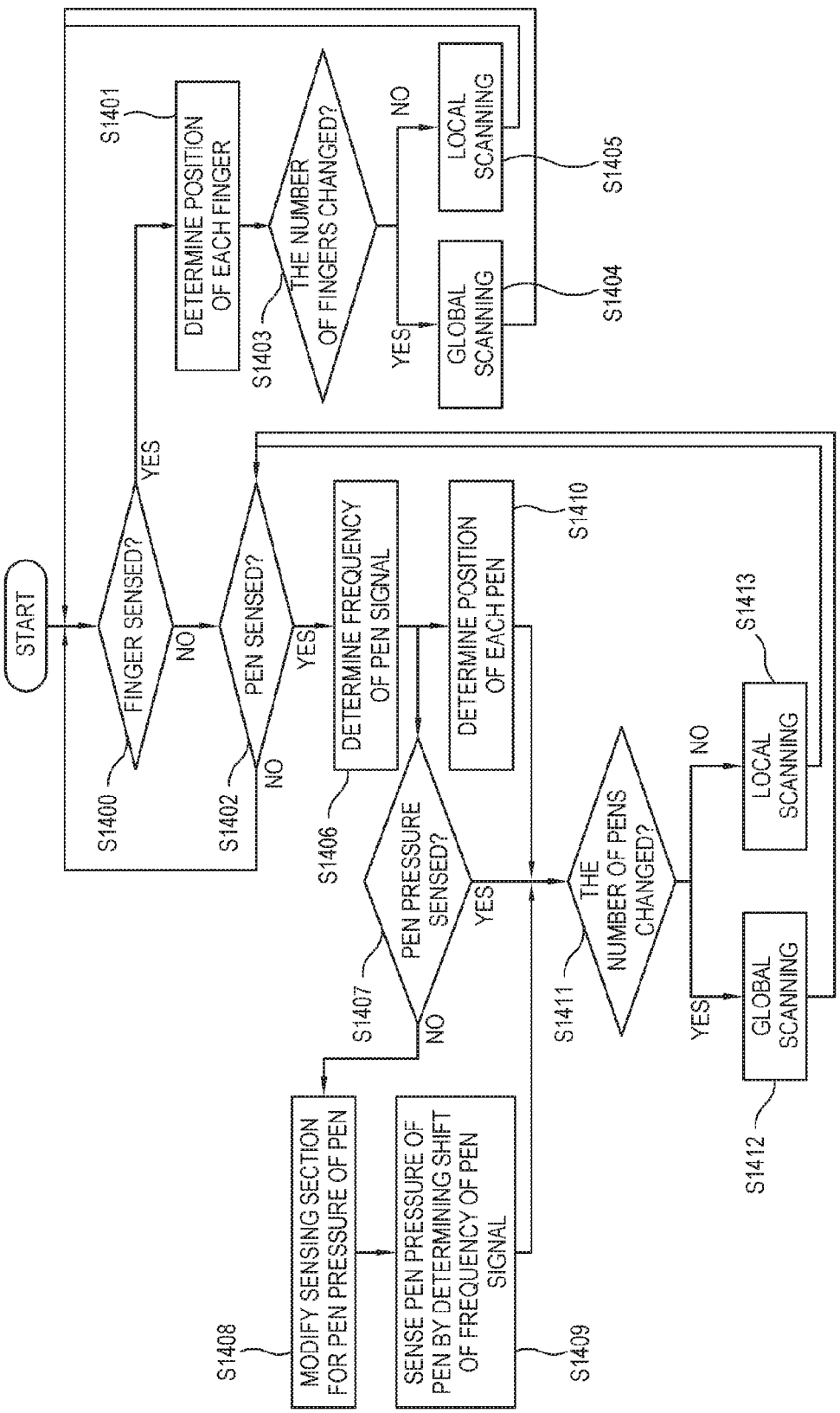
FIG. 14 is a flowchart illustrating an example method of controlling the display apparatus according to an example embodiment.

FIG. 14 is a flowchart illustrating an example method of controlling the display apparatus according to an example embodiment.

At operation S1400, the finger sensor 300 senses whether a touch input based on the finger 10 is received. If the touch input based on the finger 10 is sensed, at operation S1401 positions of the plurality of fingers 10 are determined. At operation S1403, the finger sensor 300 determines whether there is change in the number of fingers 10 making the touch input. If the number of fingers 10 is changed, at operation S1404 the finger sensor 300 performs global scan for scanning the entirety of the display panel 210. If the number of fingers 10 is not changed, at operation S1405 the finger sensor 300 performs local scanning around the position of the finger(s) 10 making the touch input.

At operation S1402, the pen sensor 301 senses whether a touch input based on the pen 2 is received. At operation S1406 the pen sensor 301 determines a frequency of a pen signal received from the pen 2. The pen sensor 301 identifies the pen 2 based on the determined frequency of the pen signal. At operation S1410, the pen sensor 301 determines the position of each identified pen 2. At operation S1407, the pen sensor 301 determines whether pen pressure is sensed. If the pen pressure is not sensed, at operation S1408 the controller 207 modifies the sensing section assigned for sensing the pen pressure of the pen 2. Then, the pen sensor 301 senses the pen pressure of the pen 2 by determining the shifted frequency of the pen signal. After the operation S1407 of sensing the pen pressure of the pen 2, at operation S1411 the pen sensor 301 determines whether there is change in the number of pens 2 making the touch input. If the number of pens 2 is changed, at operation S1412 the pen sensor 301 performs the global scanning for sensing the entirety of the display panel 210. If the number of pens 2 is not changed, at operation S1413 the pen sensor 301 performs local scanning around the position of the pen 2 making the touch input. The operations of the display apparatus according to an example embodiment shown in FIG. 14 are simply an example, and does not limit the present disclosure. For example, one of the operations may be omitted, or two operations may be performed by changing their order, or a new operation may be added.

As described above, according to an example embodiment, there are provided a display apparatus for efficiently sensing a plurality of touch inputs based on various means such as a pen, a finger, etc. without lowering a touch sensing speed, and a control method thereof.

Although various example embodiments have been illustrated and described, it will be appreciated by those skilled in the art that changes may be made in these example embodiments without departing from the principles and spirit of the disclosure, the scope of which is defined in the appended claims and their equivalents.

What is claimed is:

1. The display apparatus comprising:
a display configured to display an image and comprising a touch sensor configured to sense a touch input within a frequency sensing section; and
a controller configured to:
based on a touch input within the frequency sensing section being sensed through the touch sensor, perform an operation corresponding to the sensed touch input, and
control the touch sensor to adjust the frequency sensing section based on a characteristic of the touch input to be sensed,
wherein the characteristic of the touch input includes at least one of: a type, a strength, an input time, a speed, or an angle of the touch input.

2. The display apparatus according to claim 1, wherein the frequency sensing section comprises a first sensing section configured to sense a plurality of frequencies of touch inputs distributed at first intervals, and a second sensing section configured to sense a shift of the frequency distributed at second intervals smaller than the first interval, wherein the controller is configured to adjust at least one of the first sensing section and or the second sensing section.

3. The display apparatus according to claim 2, wherein the controller is configured to increase the second sensing section if a plurality of touch inputs corresponding to the plurality of frequencies is sensed in the first sensing section.

4. The display apparatus according to claim 2, wherein the controller is configured to identify the plurality of touch inputs based on the frequencies.

5. The display apparatus according to claim 2, wherein the controller is configured to identify at least one of: a strength, an input time or an additional command of the touch input based on the shift of the frequency.

6. The display apparatus according to claim 1, wherein the touch sensor is configured to adjust the frequency sensing section by increasing and/or decreasing at least one of: a length of the frequency sensing section or the number of frequency sensing sections within a unit time.

7. The display apparatus according to claim 1, wherein the controller is configured to adjust the frequency sensing section based on how close an input for making the touch input is to a touch screen.

8. The display apparatus according to claim 1, wherein the controller is configured to adjust the frequency sensing section based on at least one of: the number, frequencies and kinds of touch inputs.

9. The display apparatus according to claim 1, wherein the controller is configured to adjust the frequency sensing section based on a precision required in sensing the touch input.

10. The display apparatus according to claim 1, wherein the controller is configured to adjust the frequency sensing section based on whether an application and/or function related to the touch input is activated and/or inactivated.

11. The display apparatus according to claim 1, wherein the controller is configured to adjust the frequency sensing section based on an adjustment command.

12. A method of controlling a display apparatus, the method comprising:
displaying an image and sensing a touch input within a frequency sensing section; and
performing an operation corresponding to the sensed touch input based on a touch input within the frequency sensing section being sensed through the touch sensor, and
adjusting the frequency sensing section based on a characteristic of the touch input to be sensed,
wherein the characteristic of the touch input includes at least one of: a type, a strength, an input time, a speed, or an angle of the touch input.

13. The method according to claim 12, wherein the frequency sensing section comprises a first sensing section configured to sense a plurality of frequencies of touch inputs distributed at first intervals, and a second sensing section configured to sense a shift of the frequency distributed at second intervals smaller than the first interval, and
the method further comprising adjusting at least one of the first sensing section or the second sensing section.

14. The method according to claim 13, wherein the adjusting at least one of the first sensing section or the second sensing section comprises increasing the second sensing section if a plurality of touch inputs corresponding to the plurality of frequencies is sensed in the first sensing section.

15. The method according to claim 13, further comprising identifying the plurality of touch inputs based on the frequencies.

16. The method according to claim 13, further comprising identifying at least one of: a strength, an input time or an additional command of the touch input based on the shift of the frequency.

17. The method according to claim 12, wherein the adjusting the frequency sensing section comprises adjusting the sensing section by increasing and/or decreasing at least one of: a length of the sensing section or the number of sensing sections within a unit time.

18. The method according to claim 12, wherein the adjusting the frequency sensing section comprises adjusting the sensing section based on how close an input for making the touch input is to a touch screen.

19. The method according to claim 12, wherein the adjusting the frequency sensing section comprises adjusting the sensing section based on at least one of: the number, frequencies or kinds of touch inputs.

20. The method according to claim 12, wherein the adjusting the frequency sensing section comprises adjusting the sensing section based on a precision required in sensing the touch input.

* * * * *